H. DISSTON.
SECURING SAW-HANDLES TO BLADES.
No. 181,648. Patented Aug. 29, 1876.
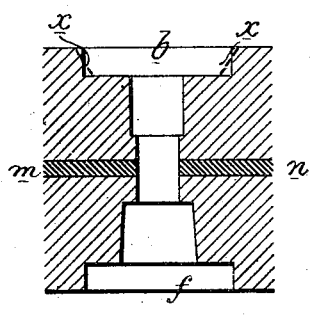
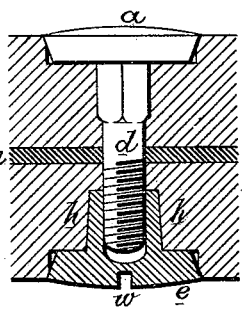
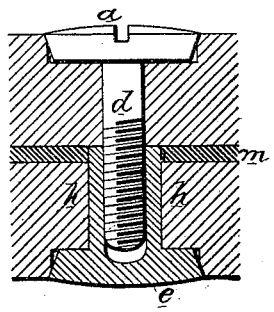
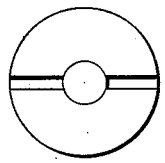
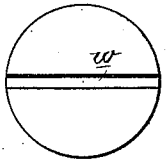
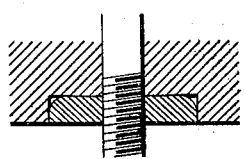
Witnesses
Harry Howson Jr
Harry Smith
Henry Disston
by his Attorneys
Howson and Son

UNITED STATES PATENT OFFICE.

HENRY DISSTON, OF PHILADELPHIA, PENNSYLVANIA.

IMPROVEMENT IN SECURING SAW-HANDLES TO BLADES.

Specification forming part of Letters Patent No. 181,648, dated August 29, 1876; application filed January 21, 1876.

*To all whom it may concern:*

Be it known that I, HENRY DISSTON, of Philadelphia, Pennsylvania, have invented an Improvement in Securing Saw - Handles to Blades, of which the following is a specification:

My invention relates to the fastening of saw-handles to blades with that class of bolts in which both the head and nut are embedded in the handle; and the object of my invention is to so construct bolts of this class, and so adapt the heads and nuts to recesses in the handle, that the necessity of resorting to the time-consuming and unsatisfactory operation of filing the head of the bolt and the nut and end of the stem flush with the sides of the handle may be obviated, and that the nut and head may always present a neat finish. A further object of my invention is to insure a steady connection of the blade with the handle of the saw by extending a projection on the nut of each bolt through the said blade. I attain this object in the manner which I will now proceed to describe, reference being had to the accompanying drawing, in which—

Figure 1 is a section, drawn to an enlarged scale, of part of a handsaw-handle with countersunk holes for receiving the bolt; Fig. 2, the same, with the bolt in place; Fig. 3, a face view of the head of the nut; Fig. 4, a face view of the nut of an ordinary bolt; Fig. 5, a sectional view of an ordinary nut; Fig. 6, a modified nut for the bolt.

In securing blades to handsaw-handles by bolts of the class to which my invention relates, it has been a common practice to make the heads of the bolts slightly thicker than the depth of the countersunk in which the heads are fitted, and also to make the nuts thicker, in the first instance, than their recesses are deep, the threaded stem of the bolt passing entirely through the nut, as shown in Fig. 5. After bolts of this class are screwed tight, the superfluous metal of the heads and nuts is filed off flush with the faces of the handle—a tedious operation—to avoid which is one of the main objects of my invention.

After a saw has been in use for some time, the blade is apt to become slightly loose, and the tightening of the nuts becomes necessary; and after this turning of the nuts, they rarely present a finished appearance, in respect to the handle.

To obviate these objections, in the manner which I will now proceed to describe, I prepare the handle, in the manner shown in Fig. 1, for the bolt illustrated in Fig. 2. The head *a* of this bolt is slightly rounded on the face, and has slightly-beveled edges. The recess *b* in the handle for the reception of this head is not made to conform to the beveled edge of the head, but has straight sides, and is a trifle less in diameter than the face of the head, and is of such a depth, compared with the thickness of the head, that the beveled edges of the latter will, on screwing the nut tight, compress the edge of the recess to about the extent indicated by the dotted lines *x x* in Fig. 1. In other words, the beveled edge of the head has formed its own bearing on the edge of the recess when it has reached the main bearing on the bottom of the same, and the edge of the face of the head is on a level and forms a neat finish with the face of the handle. Precisely the same arrangement is observed in adapting the nut *e* to its recess *f*. The nut has a tubular projection, *h*, threaded internally for receiving the threaded stem *d* of the bolt, which does not pass through the nut, as in ordinary bolts, thus enabling me to form entirely across the face of the nut a slot, *w*, Fig. 3, for receiving an ordinary screw-driver, as in that class of saw-handle bolts in which the heads and nuts are not embeded in the handle.

It should be understood that the rounded faces of both head and nut are turned and polished before the bolt is fitted to the handle; hence the usual filing of the handle, head, and nut is dispensed with.

When the nut is tightened, there will be no disfigurement, for its beveled edge has formed a permanent shoulder, which insures a snug fit and neat finish under all circumstances. Another advantage is derived from the use of the improved bolts, as the sides of the handle can be varnished before it is attached to the blade, and the application of the bolts will not disturb or injure the varnished surface.

In Figs. 1 and 2, the stem *d* of the bolt passes through a hole in the blade *m*, for steadying the same; but I prefer to make a larger hole in the blade, and to make the projection h of the nut long enough to pass through, or nearly through, the blade, as shown in Fig. 7. This long projection is turned to fit the hole, and hence insures greater steadiness of the blade than the stem d of the screw.

I claim as of my invention—

The combination of the within-described bolt, having a nut with beveled edge and rounded face and a head of like character, with recesses b and f in the handle, each recess having straight sides, and being slightly less in diameter than the head or nut which it has to receive, all as and for the purpose set forth.

In testimony whereof I have signed my name to this specification in the presence of two subscribing witnesses.

HENRY DISSTON.

Witnesses:
HARRY SMITH,
HARRY HOWSON, Jr.